Aug. 5, 1969 L. P. HAUSAM 3,459,118
AUTOMATIC URN COFFEEMAKER
Filed Jan. 11, 1968 3 Sheets-Sheet 3
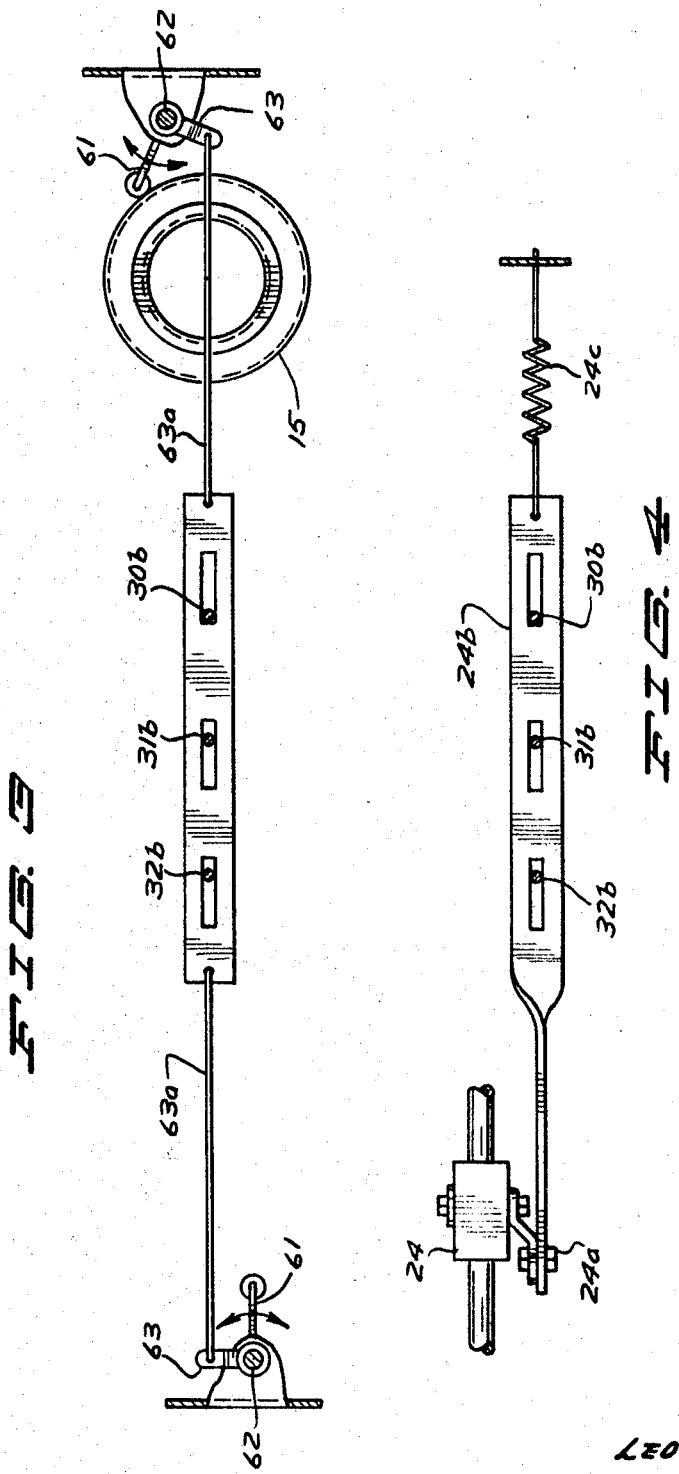
INVENTOR.
LEONARD P. HAUSAM
BY
Adams Cuoyna + Haugen
ATTORNEYS

United States Patent Office 3,459,118
Patented Aug. 5, 1969

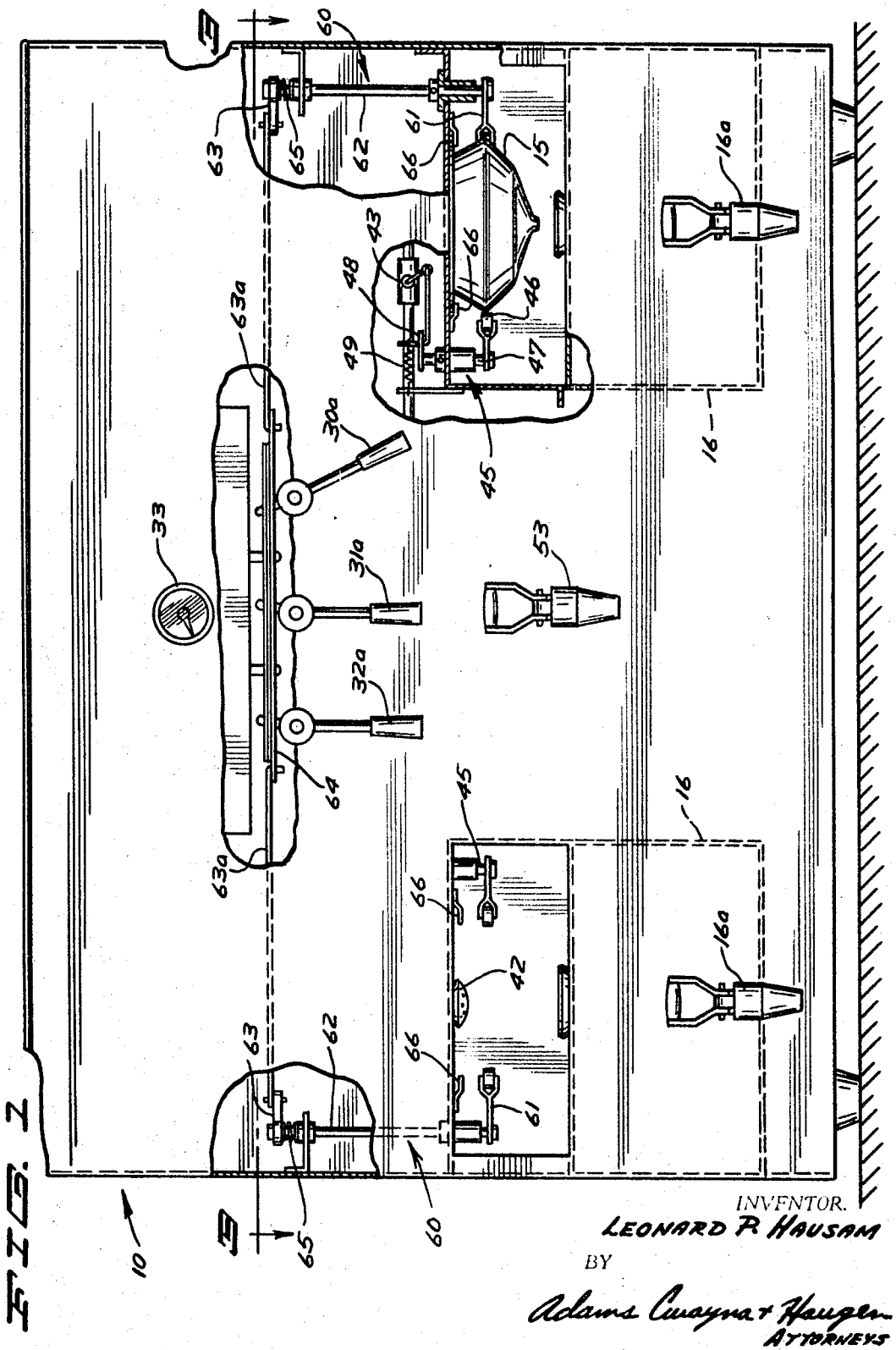

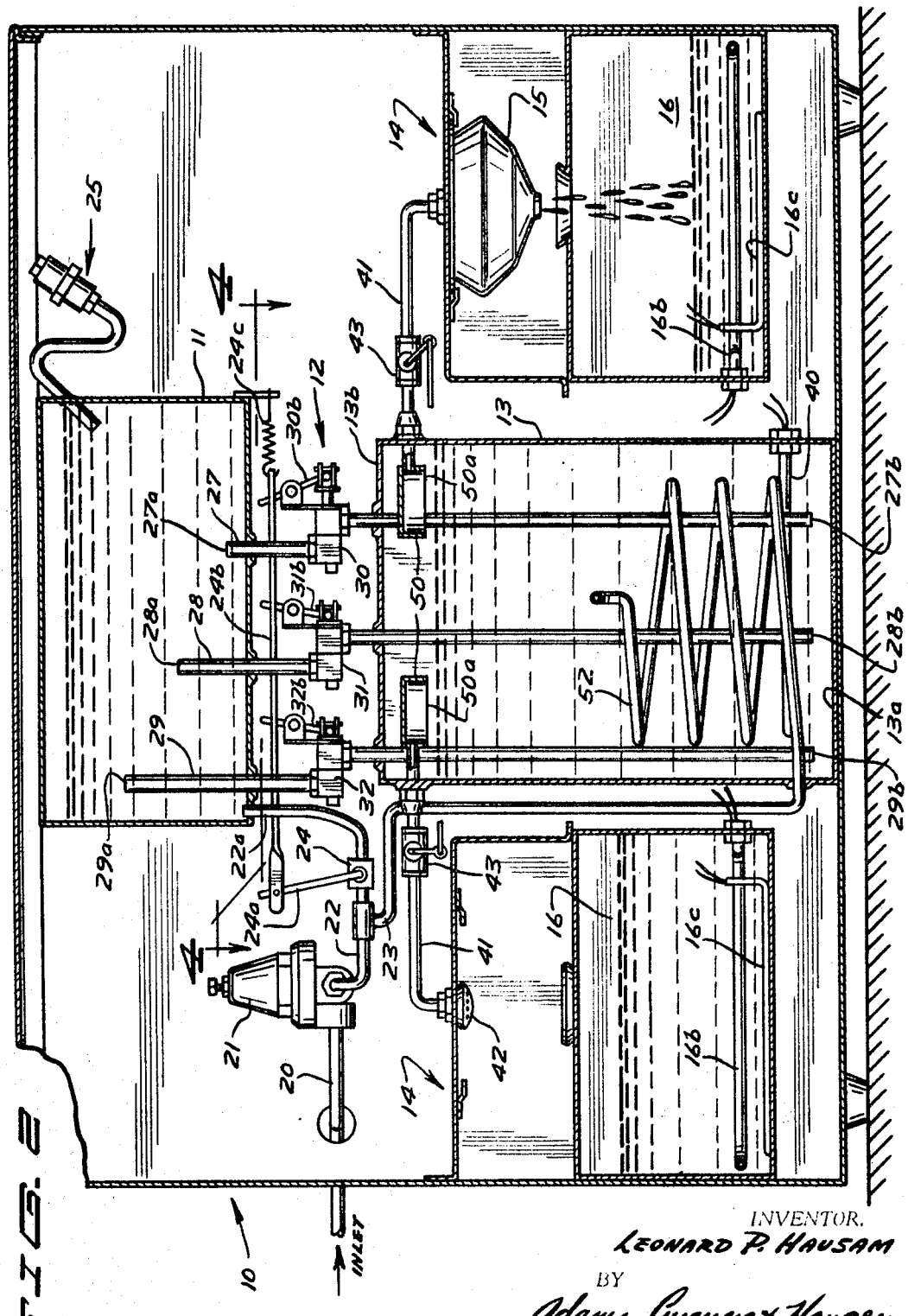

3,459,118
AUTOMATIC URN COFFEEMAKER
Leonard P. Hausam, Minneapolis, Minn., assignor to Charter Design and Manufacturing Co., Minneapolis, Minn., a corporation of Minnesota
Filed Jan. 11, 1968, Ser. No. 697,227
Int. Cl. A47j 31/40
U.S. Cl. 99—291          8 Claims

ABSTRACT OF THE DISCLOSURE

This invention relates to an automatic coffeemaker arranged for brewing various predetermined amounts of coffee and includes a first tank having a plurality of outlet conduits at different levels within the tank for delivering water to the lower portions of a pre-heating tank which pre-heating tank is provided with a pre-heat means therein to force a like amount of water upwardly from the pre-heating tank out of receiving conduit for delivery of now heated water to a coffee confining basket where the same will be sprayed over the coffee. Control means are provided in the conduits to select a proper conduit which will provide a predetermined volume of water to the pre-heating tank.

---

In the past various forms of automatic coffee brewing apparatus have been provided, many of which have been extremely complicated due to their intricate valving, timing and brewing systems. Applicant provides herein an automatic coffee maker for brewing predetermined amounts of coffee through an uncomplicated brewing system which incorporates an inlet storage tank with means for withdrawing predetermined amounts of water therefrom, means for directing this water to a heating tank and delivering a like amount of heated water from the heating tank into and over a ground coffee container section for brewing a predetermined amount of coffee as it passes thereover.

The unit provided by applicant includes a substantially simplified device which eliminates any complex timing, valving or brewing systems or the like and wherein a selectively feature of the unit provides a wide range of capacities while positively insuring that such selected capacity will be properly brewed.

The device while simple in its basic construction further includes a certain interlocking feature such that the initiation of a brewing cycle will automatically prevent accidental initiation of other cycles of the machine such that the unit is substantially foolproof in operation.

It is therefore an object of applicant's invention to provide an automatic coffeemaker which incorporates means for selectively brewing any of certain predetermined amounts of liquid coffee.

It is a further object of applicant's invention to provide an automatic coffeemaker for brewing predetermined amounts of coffee which includes certain selection features such that once any operational selection is made for the unit an interlocking arrangement is actuated which will prevent initiation of different operations of the unit thereby preventing any errors in the brewing or operational functions of the unit.

It is a further object of applicant's invention to provide an automatic coffeemaker which incorporates a siphon feature to receive, draw and deliver preheated water to be sprayed over ground dry coffee particles and wherein the particular drawing and siphoning function employed to deliver such water is arranged to positively prevent shut off of the fluid flow without dripping of the fluid after the proper amount of water has been withdrawn by the siphon.

These and other objects and advantages of my invention will more fully appear from the following description made in connection with the accompanying drawings, wherein like reference characters refer to the same or similar parts through the several views, and in which:

FIG. 1 is a front elevation of an automatic coffeemaker embodying the concepts of applicant's invention with portions thereof broken away to illustrate certain internal constructions;

FIG. 2 is a vertical section taken through the coffee-therein;

FIG. 2 is a vertical cross section taken through the coffeemaker to illustrate the internal mechanism employed therein;

FIG. 3 is a horizontal section taken substantially along line 3—3 of FIG. 2 to illustrate a first interlocking feature; and FIG. 4 is a vertical section taken substantially along line 4—4 of FIG. 2 to illustrate a second interlock feature.

In accordance with the accompanying drawings the automatic coffeemaker embodying applicant's concepts is devised to include a premeasuring or storage tank 11 with means 12 for selectively choosing the amounts of coffee to be brewed, a preheating tank 13 and a pair of coffee brewing sections 14—14 arranged to receive heated liquid from the premeasuring or preheating tank 13 for discharge over ground coffee confining baskets 15 for subsequent discharge over into liquid coffee storage containers 16—16.

The basic concept behind applicant's invention is to provide a storage tank for retaining an amount of raw water therein and then to withdraw from the tank through the utilization of selective valving structures the amount of fluid for brewing and to discharge this selected amount of fluid into a heating tank containing preheated fluid where the amount of fluid introduced will displace an amount of preheated fluid and initiate a siphon action to displace only this predetermined amount of preheated fluid for final discharge over the ground coffee. The structure utilized affords an operator the opportunity to brew any of several amounts of coffee while requiring no complicated valving, timing or pressure responsive apparatus for accomplishing the same.

In order to accomplish these above results the unit 10 is connected through a raw water inlet line 20 to a source of raw water and a regulator 21 is inserted in said line 20 to control the pressure at which the unit will operate. Continuing from the pressure regulator a conduit 22 delivers fluid to either the storage tank section 11 or to a hot water draw-off conduit 23 which will be discussed hereinafter. A valve member generally designated 24 which is in the form shown a two position valve is provided in the tank feed line 22a to control the flow of water to said tank. A relief valve generally designated 25 is arranged on tank 11 to permit air to flow into and out of said tank 11 upon filling and removal of water therefrom. Valve 25 is what is known as a float ball valve wherein air will be free to enter and flow from and to said tank 11 until a predetermined water level is reached therein at which time the floating ball contained within valve 25 will seal against the air outlet.

A plurality of conduits designated respectively 27–28–29 extend upwardly into said tank 11 from the bottom surface thereof to predetermined different heights. It should be obvious that the open ends 27a–28a–29a of said conduits will permit water to flow downwardly therethrough until the top surface thereof is reached and it should be obvious that the open ends 27a–28a–29a of ter may then be drawn from said tank 11 depending on which conduit water is allowed to flow. Conduits 27–28–

29 extend downwardly into the preheating tank 13 to discharge at the lowermost end thereof with the lowermost ends of the conduits 27b–28b–29b arranged adjacent the bottommost surface 13a of the tank 13. In the form shown this tank is provided with a cover 13b but it should be obvious that since this is not a pressure system this cover affords only means to keep such tank 13 in a clean condition.

In dependently operable valve members 30–31–32 are arranged along the respective conduits 27–28–29 and these conduits are two position, open and close valves with handle means 30a–31a–32a arranged thereon for actuation. Valve actuating elements 30b–31b–32b connecting the handles to the valves are interlocked as illustrated in FIG. 4 to a valve actuating element 24a on main line valve 24 to control the flow of water into the tank 11. The interlock positions available permit any one of the valves 30–31–32 to control the open or closed position of valve 24 and such interlocking arrangement may be easily accomplished through the incorporation of a lost motion connector bar 24b engaging respective portions of the valve operating elements 30b–31b–32b. The operation of this particular interlock is such that when any of the valves 30–31–32 are opened to permit flow from the tank 11 into the preheating tank 13 line valve 24 will be closed thus preventing flow of fluid into the tank 11. This closure of valve 24 is necessary to prevent continuous flow from the inlet line 22 through tank 11 and into the preheating tank 13. This interlock feature is arranged to automatically return valve 24 to the open position when the respective operating handle member 30a–31a or 32a is returned from the brewing to the normally closed vertical position. As illustrated in FIG. 1 30a handle has been shifted to the brewing position which will close the valve 24 and after brewing, shifting the handle 30a to a vertical position will automatically return valve 24 to open position due to the utilization of the positive spring member 24c arranged on the end of the interlock plate 24b.

In order to alert the operator of the unit of the condition of the tank 11 it should be obvious that the handle offset with regard to vertical certainly will indicate that the tank is not in full condition but rather that a selection has been made to brew an amount of coffee. In addition to this indicator a pressure responsive indicator member 33 will communicate with tank 11 to indicate the condition thereof.

The readings of indicator 33 will be fill for a less than full tank and brew when the tank is full. When the tank 11 is full the line pressure will raise the gauge 23 to read to indicate brew and upon closure of valve 24 and opening of any of the valves 30–31–32 the pressure will automatically drop to zero or the fill side of the gauge.

Preheating tank 13 includes a heating coil 40 which would normally be controlled through a thermostat and which tank 13 is arranged to hold a predetermined amount of hot water such that entering water from tank 11 which is cold will force the water upwardly within the tank 13 to initiate a siphon action such that water will discharge to either one of selected outlet lines 41—41 to be discharged through a spray head construction 42 over a coffee confining basket member 15. Each of the conduits 41—41 includes an interlock valve member 43—43 which interlock is governed and controlled through a sensing element 45—45 arranged in close adjacent association to the coffee containing basket 15 such that this valve 43 will be normally closed until a coffee confining basket 15 is inserted into proper position below a respective spray head 42.

This interlock arrangement includes a first roller or feeler member 46 arranged in abutting position with respect to the coffee containing basket 15 such that when the basket 15 is inserted therein the roller member 46 will be pushed rearwardly out of position thus pivoting a connector rod member 47 which member 47 is in turn arranged to control a second control arm 48 securely attached to rod 47 and which arm 48 then actuates the valve 43 from the normally closed to the open position. A spring return member 49 is provided to automatically return the valve 43 to closed position when the basket 15 has been removed from below spray head 42.

Siphon break devices designated 50–50 are arranged interiorly of the preheating tank 13 and communicate with each of the respective conduits 41–41 to permit and insure flow of water therethrough while absolutely insuring that when the water level drops below the base or lower surface 50a of the siphon breaks 50–50 a positive shut off will occur with no possibility of the dripping of fluid through conduit 41 and through the individual spray heads 42–42.

This particular siphon break device is further explained and described in the co-pending application, Ser. No. 384,426, filed July 24, 1964, which application, thoroughly describes the function and structure of such siphon.

Contained within the preheating tank 13 is an additional coil structure generally designated 52 which coil structure is fed from the previously mentioned conduit 23 extending from the raw water inlet line. This coil 52 provides a coil area continuously exposed to the heated fluid within tank 13 such that a source of hot water is always available to the user. A spigot or the like 53 is provided on the exterior of the unit 10 to facilitate withdrawal of hot fluid from this coil 52.

The spray heads 42 of the unit discharge directly over the ground coffee in the coffee containing baskets 15 and the fluid flowing therethrough is dispensed downwardly into the brewed coffee containing tank 16—16. Spigots 16a—16a are mounted for withdrawal of the now brewed liquid coffee contained therein. Heating coils 16b—16b are arranged within the containers 16—16 to maintain the brewed coffee at proper temperature and likewise thermostats 16c—16c are arranged within containers 16—16 to likewise maintain the temperature of the brewed coffee at proper serving level.

To further prevent errors in brewing the coffee there are provided on each of the coffee retaining containers further interlock features generally designated 60—60. This interlock feature is arranged to prevent any of the valves 30–31–32 from being shifted into brewing position unless a ground coffee containing basket 15 is properly inserted under one of the spray heads 42. This interlock feature is particularly illustrated in FIGS. 1 and 4 and includes a coffee basket sensing element 61 securely attached to a pivotally mounted rod member 62 which rod member is provided with an actuating arm 63 on the uppermost end thereof.

Arm members 63 are connected to a slide lock assembly mechanism 64 surrounding the actuating portions 30b–31b–32b of the respective valves by connector links 63a—63a extending from arms 63—63. In the particular form shown the sensing elements 61—61 are controlled with respect to the insertion of baskets 15—15 to shift the slide bar assembly 64 into position to permit any of the handles to be shifted into brewing position. Return means such as torsion springs 65—65 may be respectively placed upon the rotatable shafts 62—62 such that the arms are always returned to a forward or basket contacting position, after such baskets have been removed from the selected slide slots 66—66 which permit the mounting thereof directly below the spray heads 42—42.

In operation of this particular interlock control feature, when a basket member 15 is slid into the respective slides 66—66 sensing element 61 will be shifted rearwardly to rotate the respective rotatable shaft and connecting arm link 63 and thereby shift the interlock plate 64 to the left to permit the respective actuating elements 30b–31b–32b to move within the slots within the interlock plate 64 such that the same and the valves connected thereto may be shifted into brewing position. The spring loaded arrangement provided by spring members 65 on respective rotatable bar members 62 will prevent the shifting of any of the actuating handles 30–31–32 into open position unless a basket 15 confining ground coffee therein is in proper position above a collector tank 16—16. These return springs 65 may be strengthened to such a degree that when a basket 15 is removed from coffee brewing position the spring 65 will automatically return the vertical levers 30–31–32 into vertical position thereby also retracting the operation handle 24a of valve 24 into the fill position. In this manner it is possible to automatically fill the tank 11 after brewing and this will in effect eliminate another possible error for the operator.

The entire structure provided herein essentially utilizes the concept of automation without any complicated pressure sensitive, timing, valving or other complicated devices for brewing predetermined amounts of coffee. The particular tank structure and the withdrawal system incorporated herein provides a means for brewing certain predetermined amounts of coffee simply through the actuation of a selected valve member and it should be obvious that the particular unit described herein may be modified to brew coffee in any predetermined amount by simply changing the size of the various tanks and the like and a wide range of brewing possibilities is available herein due to such various situations.

It should be obvious that applicant has provided a new and unique coffee brewing apparatus which due to the incorporation of various sized elements will provide the means for brewing certain predetermined amounts of coffee at and through a purely automated process which will eliminate all pressure, timing and other highly sensitive devices normally utilized for controlling such a unit.

It will, of course, be understood that various changes may be made in the form, details, arrangements and proportions of parts without departing from the scope of my invention, which generally stated consists in the matter set forth in the appended claims.

What is claimed is:
1. An automatic coffeemaker for brewing predetermined amounts of coffee including:
   (a) a water storage container;
   (b) means for supplying water to said container;
   (c) a preheating tank having means for heating the water contained therein;
   (d) a plurality of conduits communicating between said storage container and tank arranged to permit flow therebetween said conduits having their receiving ends positioned within said container at substantially different receiving levels;
   (e) means for selectively controlling the flow in said conduits whereby a predetermined amount of water may flow from said container;
   (f) a spray head;
   (g) means for positioning a ground coffee containing basket in receiving relation to said spray head; and
   (h) second conduit means receiving water from the upper portion of said tank for delivery to said spray head for discharge over the coffee grounds in said basket.

2. The structure set forth in claim 1 wherein the discharge ends of said conduits are arranged at the lower end of said tank to force heated water contained therein upwardly.

3. The structure set forth in claim 1 and valve means controlling the flow of supply water to said container and the means for selectively controlling the flow through said conduits is interconnected to said valve means for control thereof whereby when water is permitted to flow through said conduits flow will be prevented from the supply.

4. The structure set forth in claim 1 and valve means are arranged to control the flow through said second conduit and said means for positioning a ground coffee containing basket includes basket sensing means to control the position of said valve permitting said valve to be open only when a basket is positioned below said spray head.

5. The structure set forth in claim 1 and sensing means arranged and constructed to sense a ground coffee containing basket under said spray head and controlling the selective flow control means for said conduits whereby said selective control means will be permitted to open only when a basket is positioned below said head.

6. The structure set forth in claim 1 and preheating coil means arranged within said preheat tank and receiving water from the supply and means controlling the discharge thereof whereby a supply of hot water is made available.

7. The structure set forth in claim 1 and siphon break means arranged on the receiving end of said second conduit to draw water from said tank to a level below said receiving end whereby a further drop in water will space the water level a predetermined distance from the conduit and to prevent any siphon action.

8. The structure set forth in claim 1 and discharge container members arranged to receive liquid coffee from below said baskets and the receiving ends of said conduits being positioned within said container in direct relation to the size of discharge members utilized to permit a volume of flow from said tank to correspond with the size of the volume of said members.

References Cited
UNITED STATES PATENTS

| | | | |
|---|---|---|---|
| 2,630,061 | 3/1953 | Sharaf | 99—291 |
| 3,179,035 | 4/1965 | Lockett | 99—282 |
| 3,326,115 | 6/1967 | Karlen | 99—291 X |

ROBERT W. JENKINS, Primary Examiner

U.S. Cl. X.R.

99—305